(12) United States Patent
Noyel et al.

(10) Patent No.: US 9,196,034 B2
(45) Date of Patent: Nov. 24, 2015

(54) METHOD OF FAST ANALYSIS OF THE RELIEF ELEMENTS FEATURING ON THE INTERNAL SURFACE OF A TYRE

(71) Applicants: Guillaume Noyel, Clermont-Ferrand (FR); Dominique Jeulin, Fontainebleau (FR); Estelle Parra-Denis, Fontainebleau (FR); Michel Bilodeau, Fontainebleau (FR)

(72) Inventors: Guillaume Noyel, Clermont-Ferrand (FR); Dominique Jeulin, Fontainebleau (FR); Estelle Parra-Denis, Fontainebleau (FR); Michel Bilodeau, Fontainebleau (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 82 days.

(21) Appl. No.: 14/348,209

(22) PCT Filed: Sep. 27, 2012

(86) PCT No.: PCT/EP2012/069153
§ 371 (c)(1),
(2) Date: Mar. 28, 2014

(87) PCT Pub. No.: WO2013/045594
PCT Pub. Date: Apr. 4, 2013

(65) Prior Publication Data
US 2014/0254912 A1    Sep. 11, 2014

(30) Foreign Application Priority Data

Sep. 30, 2011  (FR) ..................................... 11 58804

(51) Int. Cl.
*G06T 7/00*       (2006.01)
(52) U.S. Cl.
CPC ................. *G06T 7/001* (2013.01); *G06T 7/003* (2013.01); *G06T 7/0004* (2013.01); *G06T 2207/10028* (2013.01); *G06T 2207/30108* (2013.01)

(58) Field of Classification Search
USPC .................. 382/103, 141–152, 190, 256–265
See application file for complete search history.

(56) References Cited

U.S. PATENT DOCUMENTS

| 6,539,789 | B1 * | 4/2003 | Kostka et al. .................... 73/146 |
| 7,012,701 | B2 | 3/2006 | Hassler et al. ................ 356/601 |
| 2004/0071334 | A1 * | 4/2004 | Hassler et al. ................ 382/141 |
| 2013/0129182 | A1 | 5/2013 | Noyel ........................... 382/141 |

FOREIGN PATENT DOCUMENTS

| DE | 198 49 793 C1 | 3/2000 |
| EP | 2 077 442 A1 | 7/2009 |

(Continued)

OTHER PUBLICATIONS

J. Dengler et al., "Segmentation of Microcalcifications in Mammograms," IEEE Transactions on Medical Imaging, vol. 12, No. 4, pp. 634-642 (Dec. 1, 1993).

(Continued)

*Primary Examiner* — Utpal Shah
*Assistant Examiner* — Kate R Duffy
(74) *Attorney, Agent, or Firm* — Fitzpatrick, Cella, Harper & Scinto

(57) ABSTRACT

In a method of fast analysis of relief elements featuring on an inner surface of a tire, a three-dimensional image of the surface is captured, and each pixel of the image is assigned a greyscale value proportional to a topographical elevation of a point corresponding to the pixel, so as to obtain a starting image. The image is transformed into an orthogonal reference frame (OXY) in which an abscissa axis (OX) represents circumferential values and an ordinate axis (OY) represents radial values. Each point of the surface, i.e., each pixel, is assigned an altitude gradient value (f(p)) by comparing an elevation of the point with an elevation of a discrete and reduced number of points arranged on a straight line passing through a pixel being considered (p) and oriented in a circumferential direction.

13 Claims, 2 Drawing Sheets

(56) References Cited

FOREIGN PATENT DOCUMENTS

| EP | 2 295 930 A1 | 3/2011 |
| FR | 2 975 523 A1 | 11/2012 |
| WO | WO 02/48648 A1 | 6/2002 |
| WO | WO 2011/131410 A1 | 10/2011 |

OTHER PUBLICATIONS

D. Francis et al., "Shearography technology and applications: a review," Measurement Science and Technology, vol. 21, No. 10, pp. 1-29 (Oct. 1, 2010).

* cited by examiner

METHOD OF FAST ANALYSIS OF THE RELIEF ELEMENTS FEATURING ON THE INTERNAL SURFACE OF A TYRE

FIELD OF THE INVENTION

The invention relates to the field of tyre manufacture and falls more generally into the context of operations for inspecting the inner outer appearance of tyres during or at the end of the manufacturing process, for the purpose of determining conformity with respect to inspection references.

RELATED ART

Automatic industrial tyre inspection means developed by manufacturers and intended notably to assist the operators responsible for visual inspection, rely heavily on image processing techniques.

One of the steps in this process is, in a known way, to acquire the image of the tyre surface in three dimensions, using, for example, means based on the principle of optical triangulation, by implementing a 2D sensor coupled to a laser type light source.

The topographical image of the tyre surface is generally a two-dimensional 'greyscale' image in which each point, i.e. each pixel of the image, is associated with a 'greyscale' value, which is proportional to the altitude of this point with respect to the surface. This greyscale value can be usefully coded in 8 or 16 bits, or even 32 bits for better dynamics. For an 8-bit coding, the value 255 (white) corresponds to the highest altitude, and the value 0 (black) corresponds to the lowest altitude. In this way, comparison of the greyscale image featuring reliefs with a black and white image, can then be merged with greyscale image processing.

The process of analysing the image obtained consists, more particularly in the case of the internal surface of the tyre, in detecting the relief elements of the surface to be inspected and in distinguishing abnormal elements from elements such as striations or relief patterns intended to ensure air drainage during curing of the tyre. These relief elements generally project a few tenths of a millimeter beyond the average surface of the internal part of the tyre.

Analysis methods may use image processing such as morphological analysis and are described, for example, in patent application FR 11/54346 or in application WO/EP11/053284, both unpublished at the date of filing the present application. These methods implement image analysis procedures using morphological filters, such as top-hat filters, and are particularly well-suited to image analysis of the internal surface of the tyre. Document DE 198 49 793, or document WO 02/48648, describe image processing methods for a tyre sidewall for distinguishing the curvature of the sidewall from variations related to graphic elements or to surface anomalies by the use of frequency filters.

The relevance of these methods, however, is at the cost of considerable calculation time which is always worth reducing.

BRIEF DESCRIPTION OF EMBODIMENTS OF THE INVENTION

The object of the fast analysis method according to the invention is to provide an alternative solution to this problem that is less time-consuming in calculation. The object of this method is to quickly identify areas likely to contain an anomaly. Once the area is identified it is then possible to re-examine the surface in question locally using the above-mentioned tools for further analysis.

The fast analysis of relief elements comprises steps during which:
- A—the three-dimensional image of said surface is captured by assigning each pixel of the image a greyscale value proportional to the topographical elevation of this point, so as to obtain a starting image,
- B—the image of the captured surface is transformed into an orthogonal reference frame (OXY) in which the abscissa axis (OX) represents the circumferential direction and the ordinate axis (OY) represents the radial direction,
- C—each pixel of the surface is assigned an altitude gradient value by comparing its elevation with the elevation of a discrete and reduced number of points arranged on a straight line passing through the pixel considered and oriented in the circumferential direction.

Preferentially, at the conclusion of step C, the image is transformed by assigning a gradient value of zero to the pixels of which the elevation gradient has an absolute value below a given threshold.

Preferentially, the number of points, in addition to the point to which it is sought to assign said gradient value, is between 1 and 4.

When the inner surface includes striations, assessment of the altitude gradient in step C may be achieved using a single point distant from the pixel considered by a given value. This distance may usefully be substantially equal to the circumferential spacing between two striations.

For further accuracy, the altitude gradient can be assessed during step C using four points positioned on each side of said pixel.

When the inner surface includes striations, the points will be advantageously positioned upstream and downstream of the pixel considered at a distance substantially between one and ten times the circumferential width of a striation, and between one and five times the circumferential width of a striation respectively.

At the conclusion of step C, for quickly extracting the information contained in the image transformed according to the above method, a reduced circumferential profile of the image may usefully be determined by assigning to a set of points located on the same circumferential abscissa, between two values of radial ordinates ($y_1, y_2$), a value representative of their variation of elevation.

According to a first alternative, the reduced circumferential profile is determined during this step by obtaining the sum or the average of the absolute gradient values assigned to each of the pixels having the same radial position.

According to a second alternative, the reduced circumferential profile is determined by counting the number of pixels having the same radial position and having a non-zero value.

In order to extract useful information and determine the areas potentially displaying an anomaly, it is then possible to demodulate the signal representing the reduced circumferential profile by subtracting, using a low-pass filter, from said reduced circumferential profile, so as to show only the elements for which the amplitude is above said threshold.

When the inner surface includes striations, it will also be possible to demodulate the signal representing the circumferential profile by eliminating the periodic elements.

To do this, the infimum of said profile is subtracted from the reduced circumferential profile with its offset from the value of the period of circumferential appearance of the striations.

BRIEF DESCRIPTION OF THE DRAWINGS

The following description is based on FIGS. 1 to 7 in which.

DETAILED DESCRIPTION OF EMBODIMENTS OF THE INVENTION

Figure 1:
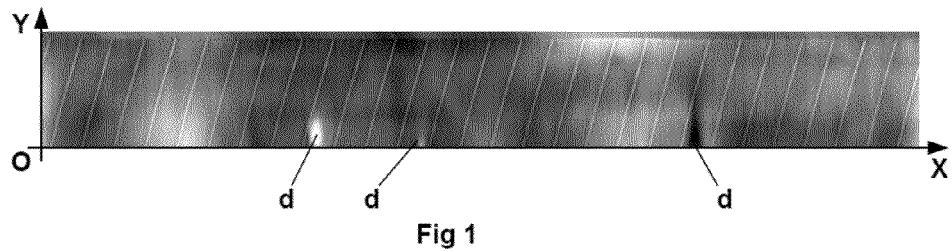
FIG. 1 is a greyscale image of the relief of the inner surface of a tyre.

The image in FIG. 1, g(p), is obtained using acquisition means based on the principle of optical triangulation, comprising a 2D sensor coupled to a laser type light source. Every pixel p(i, j) of the image is associated with a greyscale value representing the elevation of this point with respect to the internal surface of the tyre. These local elevations are mainly due to the presence of striations intended for the flow of air trapped between the curing membrane and the internal surface of the tyre during vulcanisation of the casing. They may also originate from the presence of anomalies and in this case display a positive elevation, as a negative elevation. These anomalies are identified in FIGS. 1 to 8 by the index d or are surrounded by an ellipse.

Due to the circular shape of the tyre, the identification of pixels of the original image is generally obtained in cylindrical coordinates by the acquisition means. Due to the convenience of the calculations, and although this is not absolutely necessary, it does prove, however, useful to transform this image into an orthonormal reference frame OXY to obtain an unfolded image g(p(x,y)) of the internal surface of the tyre in which for each pixel, the circumferential coordinates are plotted on the OX axis, and the radial coordinates are plotted on the OY axis.

For detecting altitude variations to extract elements that might represent anomalies, morphological operators are routinely employed, comprising combined series of opening and closing operations using correctly selected structuring elements. These methods require infimum or supremum calculation on structuring elements of substantial size comprising a large number of points. The results obtained can be used to accurately locate the objects sought.

Nevertheless, it proves useful to reduce calculation times and to reserve the use of these methods only to areas in which the presence of an abnormal value is suspected.

The object of the fast analysis method is to perform similar calculations, using a far smaller number of points, judiciously placed with respect to one another, assuming that the inner surface of a tyre does not display altitude variations that are too irregular in the circumferential direction.

The algorithms which have been successfully tested are based on the use of a reduced number of points and consist in assigning to each pixel a value f(p) representative of the altitude variation at this point. The best results have been obtained using algorithms of 2 points, 4 points or 5 points, including the pixel to which it is sought to assign the value in question. These points are aligned with one another in the circumferential direction (OX).

For a two-point algorithm, including the point the representative value is given by:

$$f(p_{x,y}) = |g(x,y) - g(x+a,y)|$$

When the inner surface includes striations, the value a is substantially equal to the circumferential distance between two striations so as to make all that is periodic in a zero and non-zero anything that is not.

For a four-point algorithm the representative value is given by:

$$f(p_{x,y}) = |g(x,y) - g(x+b,y)| - |g(x+a,y) - g(x+a+b,y)|$$

When the inner surface includes striations, the value of a may preferentially be between one and ten times the circumferential width of the striation, and the value of b between one and five times the circumferential width of the striation, so as to highlight the elements in relief of average slope. As a guide, for a passenger tyre dimension of 17″, values of a and b respectively equal to four times and twice the width of the striations have given good results.

Figure 2:
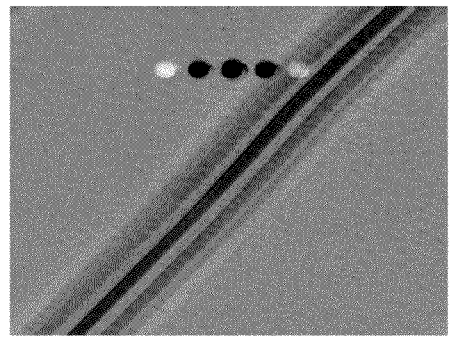
FIG. 2 shows a multipoint operator comprising 5 points.

For a five-point algorithm, as shown in FIG. 2, the representative value is given by:

$$f(p_{x,y}) = \alpha(|g(x-a,y) - g(x-b,y)| + |g(x+a,y) - g(x+b,y)|) - \beta(|g(x,y) - g(x-b,y)| - |g(x,y) - g(x+b,y)|)$$

When the inner surface includes striations, the value of a is substantially equal to twice the circumferential width of the striation, and the value of b is substantially equal to the circumferential width of the striation, so as to highlight the striations and elements in relief with the steepest slope.

To improve the contrasts between gradients with a steep slope such as the edges, or with a low slope such as the top parts, the respective weights of the two areas may be modified using weighting coefficients α and β, with α+β=1.

A five-point algorithm can also be used to locate the x abscissa of the edge of a disturbance, assuming that the form of the disturbance includes an input and an output corresponding to a steep gradient of the circumferential profile. This information is accessible from the differences |g(x−a,y)−g(x−b,y)| and |g(x+a,y)−g(x+b,y)|. The vicinity of the top of the disturbance corresponds to a lower gradient, accessible from the differences |g(x,y)−g(x−b,y)| and |g(x,y)−g(x+b,y)|.

The top of the disturbance corresponds to the value of x that maximises the expression:

$$f(p_{x,y}) = |g(x-a,y) - g(x-b,y)| + |g(x+a,y) - g(x+b,y)| - |g(x,y) - g(x-b,y)| - |g(x,y) - g(x+b,y)|$$

Figure 3:
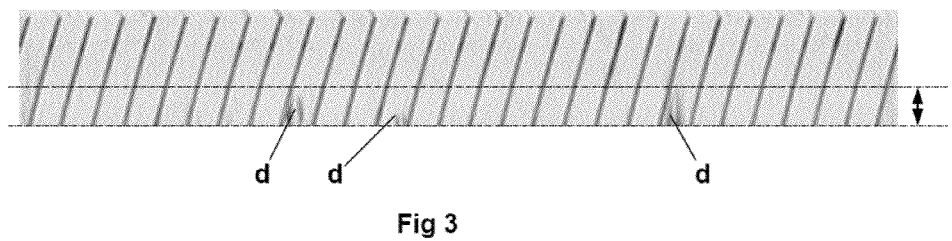
FIG. 3 shows the elevation variation profile after processing using a multipoint comprising 5 points.

FIG. 3 represents the image of the surface after transformation using a multipoint operator comprising five points.

Once the whole image is transformed using the multipoint operator, and still with the idea of reducing calculation times, it is possible at this stage to transform the image into a reduced image.

Figure 4:
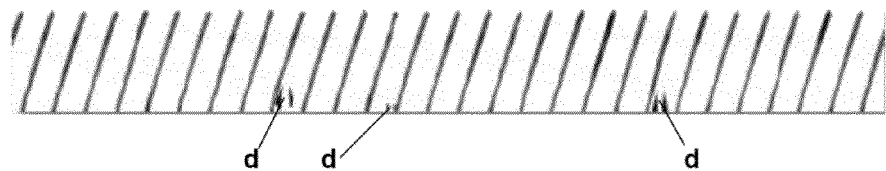
FIG. 4 shows the image of FIG. 3 after thresholding.

For improving the sensitivity of the method, it is wise, before reducing the image, to reduce to a zero value the points for which the altitude gradient has an absolute value below a given threshold. FIG. 4 shows the image of FIG. 3 after this thresholding operation.

Image reduction consists in reducing the transformed image of the surface which is an image in two dimensions, depicted as a two-dimensional array of values representing the altitude variations f(x) at each of the points of the image, to a representation in one dimension embodied in a curve or a signal of the reduced circumferential profile r(x) representative of the signature of the surface relief variations.

This process thus consists in a set of pixels having the same radial position (y=constant) being assigned a value representative of the altitude variation of these pixels.

Figure 5:
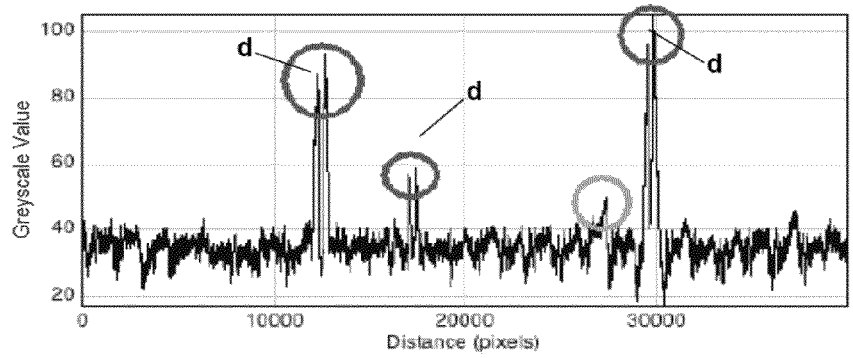
FIG. 5 shows the circumferential profile of the image in FIG. 4 after counting non-zero pixels.

A first method of proceeding consists in simply counting the number of pixels having a non-zero value and placed on the same circumferential abscissa. FIG. 5 shows an image reduction of FIG. 4 according to this first reduction method.

Alternatively the sum or the average of the absolute gradient values of each of the pixels may be obtained:

$$r(x) = \sum_{y=y_1}^{y=y_2} |f(p(x,y)|$$

Figure 6:
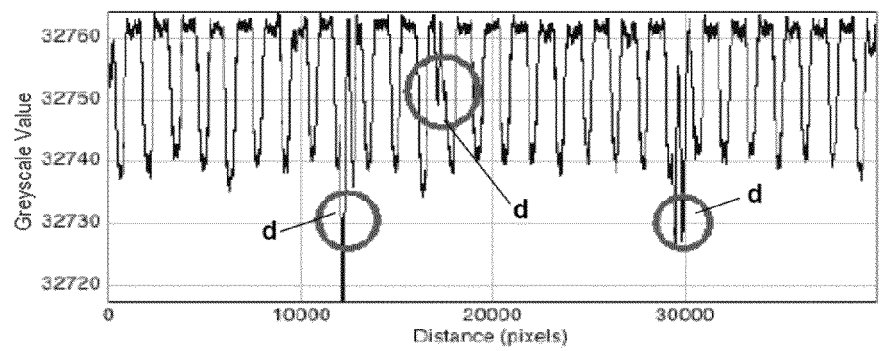
FIG. 6 shows the circumferential profile calculated on the average of the greyscale values of the lower third of the image in FIG. 3.

FIG. 6 shows a reduction of the image in FIG. 4 according to this second reduction method.

Anomalies are easily identified on these two images. However, it can be seen in FIG. 5 that a further anomaly has slipped in among the three that had been previously identified on the tyre surface. On the other hand, this anomaly does not appear in the graph in FIG. 6. Which may be considered here as a wrong detection due to the simplicity of the analysis method employed. However, when considering the use of the method as a first approach with a view to initiating more exhaustive analyses on the areas suspected of containing an anomaly, it is preferable to focus on wrong detections rather than missed detections.

It is also observed that both of these reduced representations highlight periodic variations which are due to striations present on the inner surface of the tyre. These periodic variations are in addition to disturbances and occur in the vicinity of an anomaly. Assuming that, in the case of a tyre, these anomalies are not of a periodic nature, it may prove advantageous to extract the periodic elements from the curve representing the reduced circumferential profile of the image of the inside of the tyre.

Figure 7:
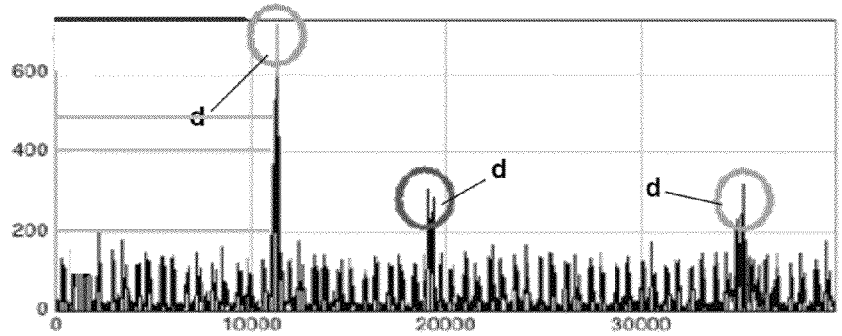
FIG. 7 shows the image in FIG. 6 demodulated using a low-pass filter.

A first method may provide for subtracting the signal transformed by a low-pass filter as shown in FIG. 7 in which the circumferential abscissae of anomalies are easy to locate. By modifying the threshold of this filter the detection sensitivity can easily be adjusted, and, if desired, focus on the number of wrong detections.

If the periodicity s of the striations is relatively constant and known, the signal of the reduced circumferential profile can also be demodulated by subtracting the infimum of the profile with its offset from the values of said profile.

$$m(x) = r(x) - \wedge (r(x), r(x-s))$$

Figure 8:
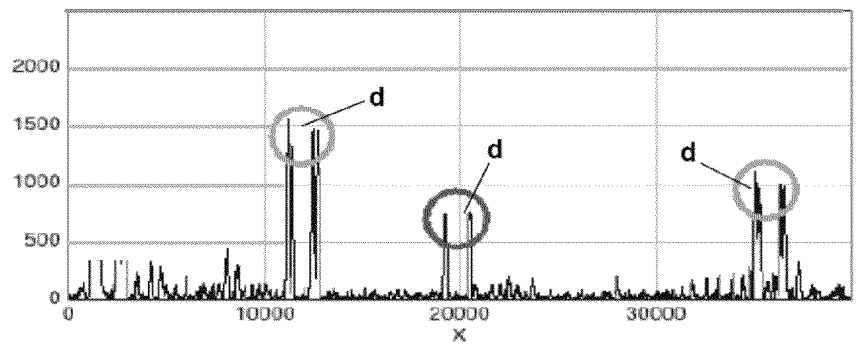
FIG. 8 shows the image in FIG. 6 demodulated by extracting the periodic value of striations.

The result is shown in FIG. 8.

The same anomalies emerge from the same circumferential abscissa values.

The interest of the method described above lies in being able to perform a first fast analysis for highlighting areas displaying a potential anomaly.

Once these areas are identified, it is then possible to initiate more exhaustive analyses with the aid of calculation algorithms using morphological analysis tools such as those described in patent applications FR 1154346 or WO/EP11/053284 cited previously.

The invention claimed is:

1. A method of fast analysis of relief elements on an internal surface of a tyre, the method comprising steps of:
capturing a three-dimensional image of the internal surface of the tyre, each pixel (p(i,j)) of a plurality of pixels of the captured image corresponding to a topographical elevation of a point of the tyre;
assigning to each pixel of the plurality of pixels of the captured image a greyscale value (g(p)) proportional to the topographical elevation of a corresponding point of the tyre, so as to obtain a starting image;
transforming the starting image into an orthogonal reference frame (OXY) in which an abscissa axis (OX) represents a circumferential direction and an ordinate axis (OY) represents a radial direction;
assigning to each pixel (p(x,y)) of a plurality of pixels of the transformed image an altitude gradient value (f(p)) by comparing an elevation of a point corresponding to a pixel being considered (p) with elevations of a number of points arranged on a straight line passing through the pixel being considered and oriented in the circumferential direction, wherein the number of points is between 1 and 4.

2. The method of fast analysis according to claim 1, further comprising a step of, after the step of assigning an altitude gradient value to each pixel, assigning a gradient value of zero to each pixel for which an altitude gradient value (f(p)) has an absolute value below a given threshold.

3. The method of fast analysis according to claim 2, wherein, during the step of assigning an altitude gradient value to each pixel, an altitude gradient value $(f(p_{x,y})=|g(x,y)-g(x+a,y)|)$ is assessed using a single point distant from a point corresponding to a pixel being considered (p(x,y)) by a given value (a).

4. The method of fast analysis according to claim 3, wherein the internal surface includes striations, and wherein the single point is distant from the point corresponding to the pixel being considered by a length having the given value (a), which corresponds substantially to a circumferential spacing or width between two striations.

5. The method of fast analysis according to claim 2, wherein, during the step of assigning an altitude gradient value to each pixel, an altitude gradient value $$(f(p_{x,y})=|g(x,y)-g(x+b,y)|-g(x+a,y)-g(x+a+b,y),$$

$$f(p_{x,y})=\alpha(|g(x-a,y)-g(x-b,y)|+|g(x+a,y)-g(x+b,y)|)-\beta (|g(x,y)-g(x-b,y)|-|g(x,y)-g(x+b,y)|))$$

is assessed using four points positioned on one side of the pixel being considered and four points positioned on another side of the pixel being considered.

6. The method of fast analysis according to claim 5,
wherein the internal surface includes striations, and
wherein a value of (a) is between one and ten times a circumferential width of a striation, and a value of (b) is between one and five times the circumferential width of a striation.

7. The method of fast analysis according to claim 1, further comprising a step of, after the step of assigning an altitude gradient value to each pixel, determining a reduced circumferential profile by assigning to a set of points located on a same circumferential abscissa, between two values of radial ordinates $(y_1, y_2)$, a value (r(x)) representative of a variation of elevation of the points of the set.

8. The method of fast analysis according to claim 7, wherein the reduced circumferential profile is determined by obtaining a sum or an average of absolute gradient values assigned to each of a group of pixels having a same radial position $$(r(x) = \sum_{y=y_1}^{y=y_2} f(p(x,y)).$$

9. The method of fast analysis according to claim 7, wherein the reduced circumferential profile (r(x)) is determined by counting a number of pixels situated on a same circumferential abscissa having a non-zero value.

10. The method of fast analysis according to claim 7, wherein a signal representing the reduced circumferential profile (r(x)) is demodulated.

11. The method of fast analysis according to claim 10, wherein the signal is demodulated by using a low-pass filter to subtract features from the reduced circumferential profile (r(x)), so as to show only elements having an amplitude above a threshold of the low-pass filter.

12. The method of fast analysis according to claim 10, wherein the internal surface includes striations, and wherein the signal representing the reduced circumferential profile (r(x)) is demodulated by eliminating periodic elements.

13. The method of fast analysis according to claim 12, wherein an infimum of the reduced circumferential profile (r(x)) is subtracted from the reduced circumferential profile with an offset from a value of a period of a circumferential appearance of striations $$(m(x)=r(x)-\wedge(r(x),r(x-s))).$$

\* \* \* \* \*